(12) United States Patent
Miyaishi et al.

(10) Patent No.: US 7,525,049 B2
(45) Date of Patent: Apr. 28, 2009

(54) ELECTRONIC COMPONENT CASE AND BATTERY AND ELECTRIC DOUBLE LAYER CAPACITOR

(75) Inventors: Manabu Miyaishi, Shiga (JP); Yoshiaki Ueda, Shiga (JP); Yoshihiro Ushio, Shiga (JP)

(73) Assignee: Kyocera Corporation, Kyoto (JP)

( * ) Notice: Subject to any disclaimer, the term of this patent is extended or adjusted under 35 U.S.C. 154(b) by 597 days.

(21) Appl. No.: 11/212,005

(22) Filed: Aug. 25, 2005

(65) Prior Publication Data

US 2006/0044738 A1 Mar. 2, 2006

(30) Foreign Application Priority Data

Aug. 26, 2004 (JP) ............................. 2004-247507
Sep. 28, 2004 (JP) ............................. 2004-282393

(51) Int. Cl.
*H05K 1/09* (2006.01)
(52) U.S. Cl. ...................................... 174/257
(58) Field of Classification Search ................. 174/254, 174/257; 439/63; 361/600
See application file for complete search history.

(56) References Cited

U.S. PATENT DOCUMENTS

| | | | | |
|---|---|---|---|---|
| 5,516,294 | A * | 5/1996 | Andrews et al. | ............. 439/63 |
| 6,376,109 | B1 | 4/2002 | Sano et al. | |
| 6,449,139 | B1 * | 9/2002 | Farahmandi et al. | ........ 361/502 |
| 6,451,073 | B1 * | 9/2002 | Farahmandi et al. | ....... 29/25.03 |
| 6,749,649 | B2 | 6/2004 | Sano et al. | |
| 2002/0090537 | A1 | 7/2002 | Sano et al. | |
| 2004/0157121 | A1 | 8/2004 | Watanabe et al. | |

FOREIGN PATENT DOCUMENTS

| | | |
|---|---|---|
| JP | A 57-80656 | 5/1982 |
| JP | A 59-127362 | 7/1984 |
| JP | A 2000-106195 | 4/2000 |
| JP | A 2001-216952 | 10/2001 |
| JP | A 2002-50551 | 2/2002 |
| JP | A 2003-100569 | 4/2003 |
| JP | A 2004-227959 | 8/2004 |

* cited by examiner

*Primary Examiner*—Dean A. Reichard
*Assistant Examiner*—Abiy Getachew
(74) *Attorney, Agent, or Firm*—Volpe and Koenig, P.C.

(57) ABSTRACT

A battery case as an electronic component case includes a second conductive plate made of metal, an insulating wall having an upper end surface and a bottom end surface, a first conductive plate made of metal joined to an upper end surface of the insulating wall, and a second conductive plate attached to the bottom end surface of the insulating wall. The insulating wall has a first conductor layer formed on an entire perimeter of the upper end surface thereof and a second conductor layer formed on an entire perimeter of a lower surface thereof, an electrode formed at a peripheral portion of the lower surface of the insulating wall so as to be electrically independent from the second conductor layer, an external connection terminal brazed to the electrode, and a connection conductor formed from the first conductor layer to the electrode. The first conductive plate is attached to the insulating wall via the first conductor layer. The second conductive plate is attached to the insulating wall via the second conductor layer.

13 Claims, 8 Drawing Sheets

ELECTRONIC COMPONENT CASE AND BATTERY AND ELECTRIC DOUBLE LAYER CAPACITOR

FIELD OF INVENTION

The present invention relates to an electronic component case, such as a battery case for a rechargeable battery or the like, an electric double layer capacitor case, a battery and an electric double layer capacitor. More specifically, it relates to a slim-type battery case and battery for small-sized electronic equipment like a cellular phone, an electric double layer capacitor case and electric double layer capacitor for a backup power supply of a semiconductor memory, a spare power source of small-sized electronic equipment and the like.

BACKGROUND

In recent years, the rapid development of mobile equipment, typified by the cellular phone, the mobile computer, the videotape recorder with an integrated camera and so on, has increased the need for reduced size and weight, especially in batteries and electronic components. At the same time, the demand for an increase in battery power has increased research on size and weight reductions while increasing the energy density of the battery. In particular, research for lithium batteries has been increasing, and now, lithium batteries serve as a preferred power source for mobile equipment.

Batteries typically have a positive electrode and a negative electrode separated by an insulating separator; they are stored in a sealed metal container that includes an electrolytic solution.

The positive electrode of a lithium battery can be obtained by adding an electrically conductive material to a metallic oxide as a positive electrode active material. Lithium cobaltite ($LiCoO_2$) or lithium manganate ($LiMn_2O_4$) may be used as the positive electrode active material, for example, and acetylene black (AB) or graphite may be used as the electrically conductive material. The negative electrode of the battery may be obtained by solidifying an active material such as a lithium titan composite oxide like lithium titanate ($Li_4Ti_5O_{12}$), graphite or amorphous carbon with resin. The negative electrode is produced in a like manner by adding and mixing a binder such as polytetrafluoroethylene or polyvinylidene fluoride to the active material to form the slurry, and then molding the slurry to form into a certain shape of negative electrode such as a sheet. A non-woven or microporous film separator, of polyolefin fiber having a heat resistance temperature of approximately 150° C., is interposed between electrodes, and a suitable electrolytic solution is provided. One suitable electrolyte solution is described hereinafter.

In such a lithium battery, the charge-discharge voltage of the positive electrode is approximately 4 V, whereas the charge-discharge voltage of the negative electrode active material is around 0 V, so that a high discharge voltage of approximately 3.5 V is achieved.

Figure 1:
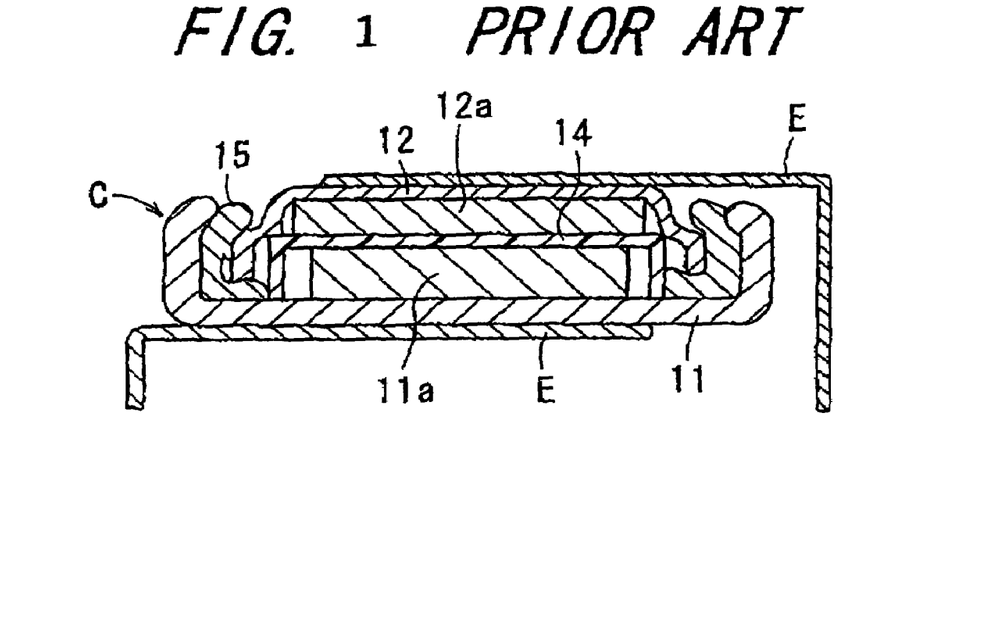
FIG. 1 is a cross section view showing an example of a prior art hermetically sealed battery or capacitor.

In prior art FIG. 1, the hermetically sealed battery C has a positive electrode case 11 provided with a positive electrode 11a made, for example, of stainless steel, and the opposing metallic sealing plate 12 provided with a negative electrode 12a made, for example, of stainless steel, in a vessel formed by joining the rim of the positive electrode case 11 and the rim of the sealing plate 12 mutually caulking and with a gasket material 15, with an electrolyte contained in insulation sheet 14 sandwiched between the positive electrode 11a and the negative electrode 12a. Charging and discharging at the positive electrode 11a and the negative electrode 12a are performed via external connection terminal members E attached to the positive electrode case 11 and the sealing plate 12. Such a construction is discussed in Japanese Unexamined Patent Publication JP-A 2000-106195 which also discusses an electric double layer capacitor of similar construction.

Figure 2:
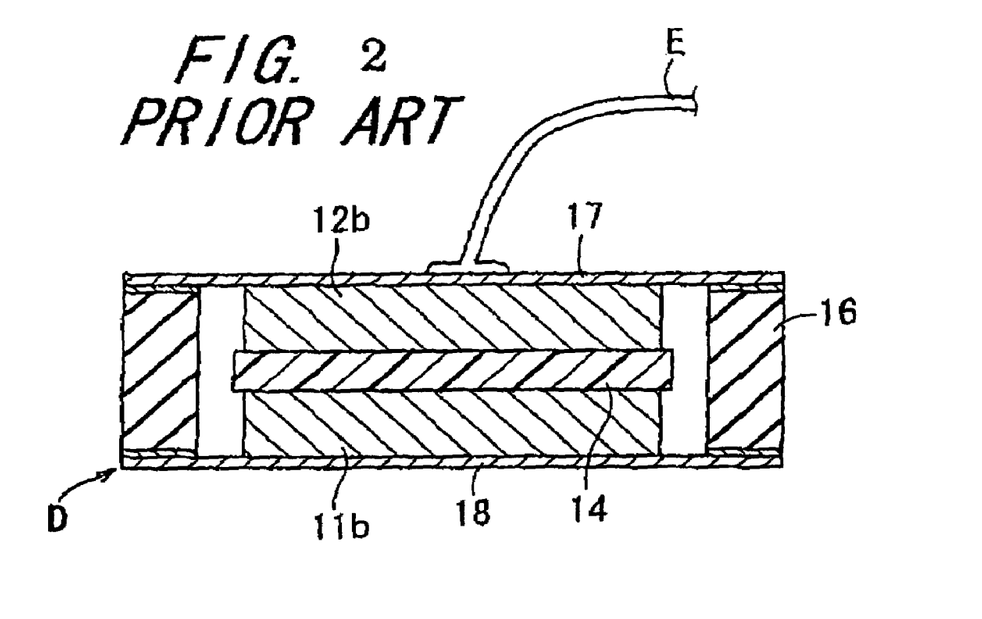
FIG. 2 is a cross section showing an example of a prior art solid electrolyte battery.

Prior art FIG. 2 shows a flat-type solid electrolyte battery D that uses a solid electrolyte as a battery element. This structure has the upper and lower surfaces of a ceramic frame 16 sealed with a lid plate 17 and a bottom plate 18 to define a hollow portion having a solid electrolyte body 14, a positive electrode 11b and a negative electrode 12b. The electrodes are electrically connected respectively to the bottom plate 18 and the lid plate 17 on opposite sides of the solid electrolyte 14 in a sealed container. In the solid electrolyte battery D, metalized layers are formed on the upper and lower surfaces of the ceramic frame 16 in order to join the bottom plate 18 and the lid plate 17 to the ceramic frame 16 via a conductive material (not shown) such as silver (Ag) solder. The electric connecting terminal E is also provided. Such a construction is discussed in Japanese Unexamined Patent Publication JP-A 57-80656 (1982). Further, in Japanese Unexamined Patent Publication JP-A 2001-216952, in order to avoid the use of the electric connecting terminal E, there is disclosed a battery or an electric double layer capacitor comprising an active material used as a positive electrode and a negative electrode, an electrolyte and a container which receives them therein, wherein the container is composed of a recessed container and a sealing plate, a first electrode is led from an inner bottom surface of the recessed container to an outer bottom surface of the recessed container, and a second electrode is led from an upper surface of the recessed container to the outer bottom surface, thereby the outer bottom surface of the recessed container is connected to an electrode of an external electric circuit board.

The prior art attempts suffer from several problems such as electrolyte leakage, degrading, corrosion or deterioration of the case or container by newer high-performance electrolytic solutions, and difficult external connections. Additional prior art attempts at solving these problems are disclosed in Japanese Unexamined Patent Publications JP-A 2002-50551 and JP-A 2003-100569.

SUMMARY

The present invention concerns an electronic component case comprising an insulating wall having a first conductor layer formed on an entire perimeter of one surface thereof and a second conductor layer formed on an entire perimeter of another surface thereof; an electrode formed at a peripheral portion of the another surface and electrically independent from the second conductor layer; an external terminal connected to the electrode; and a connection conductor from the first conductor layer to the electrode; a first conductive plate attached to an upper end surface of the insulating wall via the first conductor layer; and a second conductive plate attached to a bottom end surface of the insulating wall via the second conductor layer. The invention also contemplates batteries and electronic components that are assembled in the case.

BRIEF DESCRIPTION OF THE DRAWING(S)

Other and further objects, features, and advantages of the invention will be more explicit from the following detailed description taken with reference to the drawings wherein.

DETAILED DESCRIPTION OF THE PREFERRED EMBODIMENT(S)

Detailed descriptions of preferred embodiments of the invention are described below with reference to the drawings. The terms top, bottom, upper, lower, side, vertical and horizontal refer to positions in the drawings and not to actual positions of use for the subject inventions.

Figure 3:
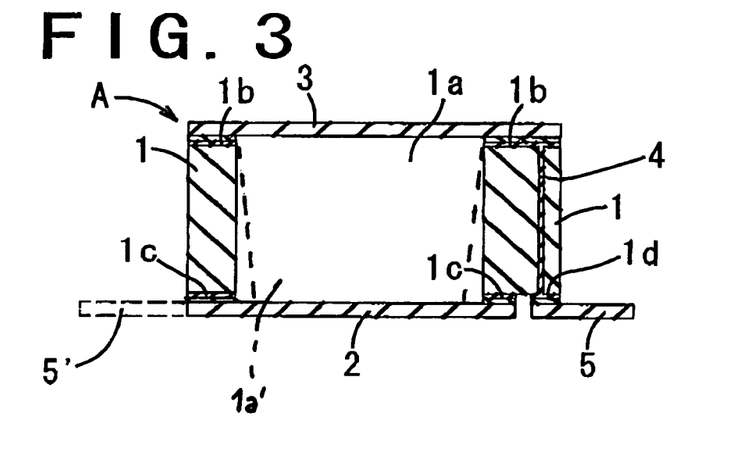
FIG. 3 is a cross section of an electronic component case according to a first embodiment of the invention.
Figure 4:
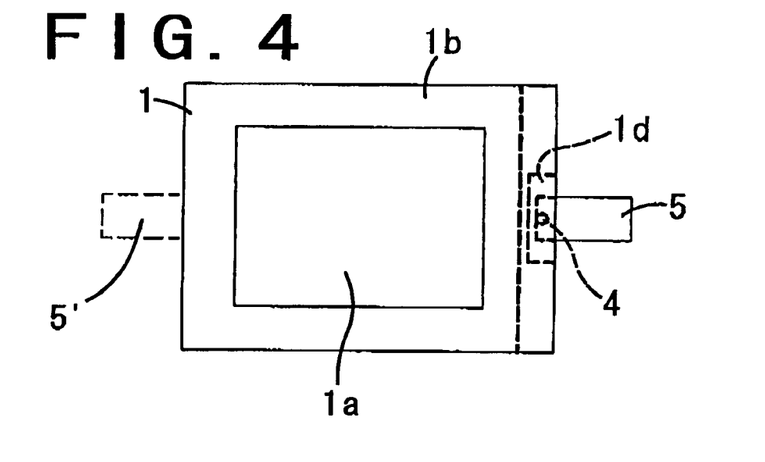
FIG. 4 is a full top plan view of a case according to a first embodiment of the invention with a first conductive plate removed.
Figure 5:
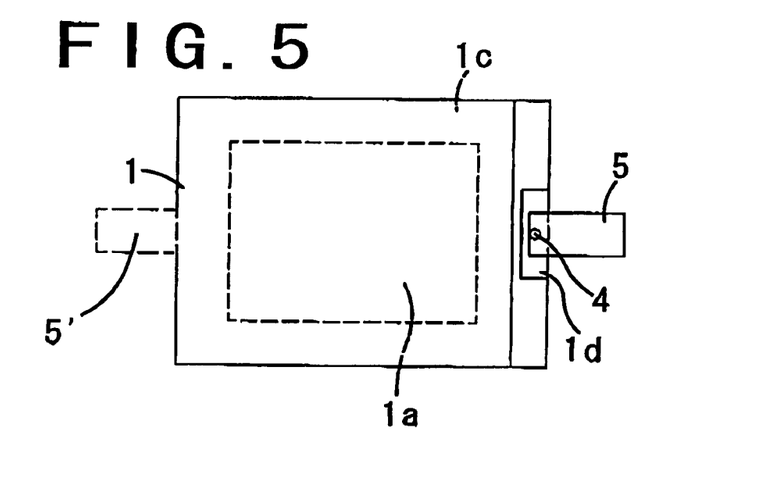
FIG. 5 is a full bottom plan view of a case according to a first embodiment of the invention.

FIGS. 3, 4 and 5, show an electronic component case according to a first embodiment of the invention, FIG. 3 is a cross section, FIG. 4 is a top plan view of a component case of FIG. 3 with a first conductive plate 3 removed, and FIG. 5 is a bottom plan view of FIG. 4. Referring to these drawings, a component case A includes an insulating wall 1 having an upper end surface and a bottom end surface, and defining an interior void, a first conductive plate 3 made of metal attached to an upper end surface of the insulating wall 1, and a second conductive plate 2 made of metal attached to the bottom end surface of the insulating wall 1. A hollow or open portion 1a, having a desired shape, such as rectangular, polygonal or cylindrical, is formed within the insulating wall 1. The insulating wall 1 has a first conductor layer 1b formed on the entire perimeter of the upper end surface thereof, and a second conductor layer 1c formed on the entire perimeter of the lower surface thereof. The electrode 1d, see FIGS. 4 and 5, formed at the peripheral portion of the lower surface of the insulating wall 1 is electrically independent from the second conductor layer 1c, an external connection terminal 5 is electrically connected to the electrode 1d, and a connection conductor 4 connects the first conductor layer 1b to the electrode 1d. The second conductive plate 2 is attached to the insulating wall 1 via the second conductor layer 1c, and the first conductive plate 3 is joined to the insulating wall 1 via the first conductor layer 1b.

The insulating wall 1 may be made of ceramics, resin or glass. In addition, the insulating wall 1 may have such a structure that a periphery of a metallic body is coated with an insulating layer. The insulating wall 1 may be formed in a rectangular shape, a circular shape or a polygonal shape when it is shown in a plan view. In a case of the rectangular shape, a design of a circuit board whose component arrangement is designed by separating a mounting area thereof in rectangular regions, is facilitated. In a case of the polygonal shape, a free form case which may be arranged in the remaining region of the circuit board in which components are arranged, can be realized. In a case of the circular shape, with reference to toughness against external pressure is improved. With reference to the first conductive plate 3 it is only required that at least a bottom surface thereof is electrically conductive. With reference to the second conductive plate 2, it is only required that at least parts of an upper surface and a bottom surface thereof are electrically conductive and the electrically conductive portions of the upper and bottom surfaces are electrically connected with each other. The first conductive plate 3 and the second conductive plate 2 may be bonded to the insulating wall 1 with a resin adhesive, or a conductive resin adhesive containing conductive particles or the like. Preferably, the second conductive plate 2 extends out from the bottom end surface of the insulating wall 1. The connection conductor 4 may be a conductor which is disposed apart from an outer surface of the insulating wall 1 and which electrically connects the first conductive plate and the external terminal 5.

Figure 6:
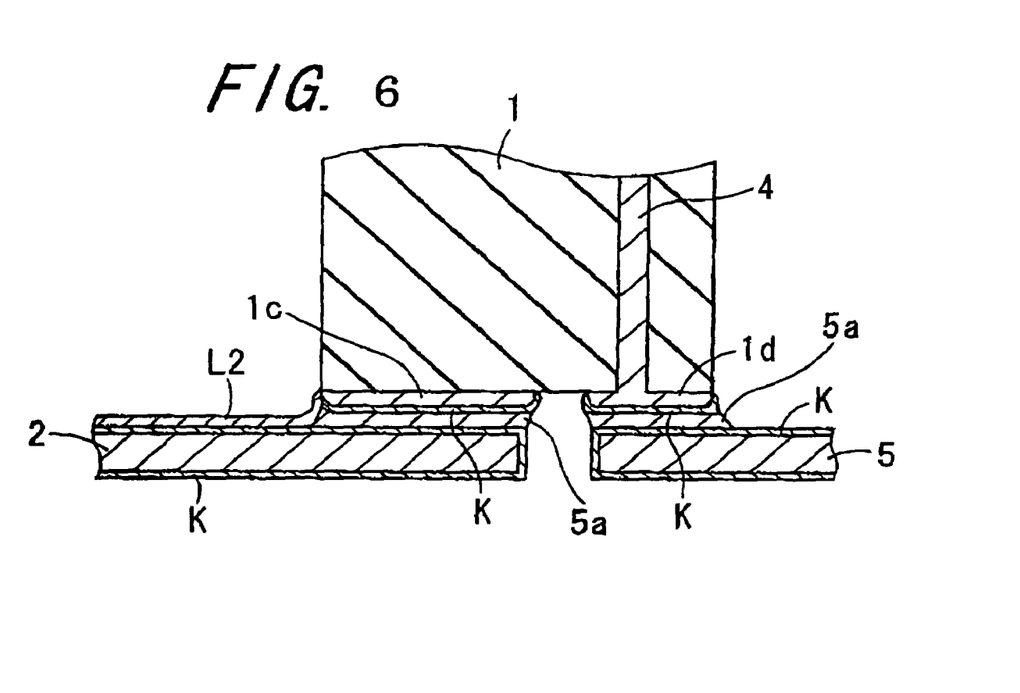
FIG. 6 is a partially enlarged cross section of the lower right part of FIG. 3.
Figure 7:
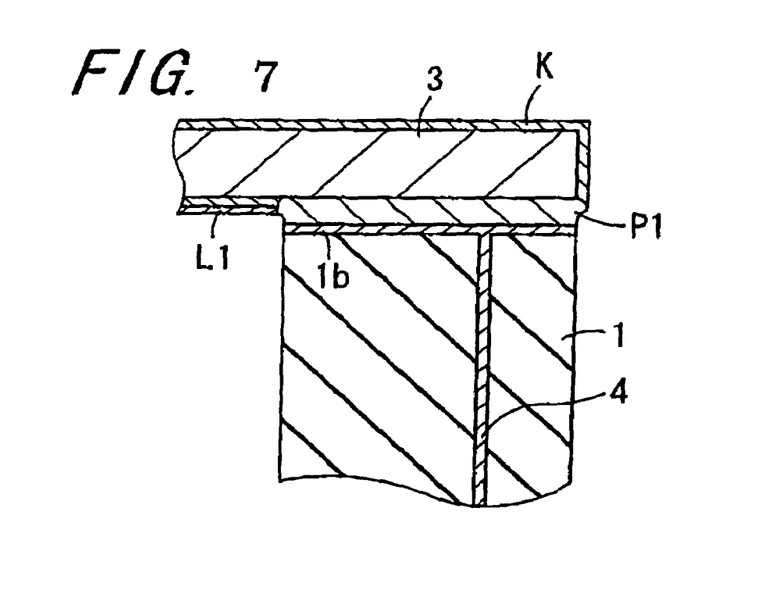
FIG. 7 is a partially enlarged cross section of the upper right part of FIG. 3.

FIGS. 6 and 7 are enlarged partial cross section of FIG. 3. FIG. 6 shows the joining portions of the insulating wall 1 to the second conductive plate 2 and the external connection terminal 5 at the lower right part in FIG. 3, and FIG. 7 shows the joining portion of the insulating wall 1 to the first conductive plate 3 at the upper right part in FIG. 3. In FIGS. 6 and 7, reference numeral 5a denotes a conductive material which joins the second conductive plate 2 and the external connection terminal 5 to the insulating wall 1, reference symbol K denotes a nickel layer, reference symbol L1 denotes an aluminum layer formed on the first conductive plate 3, reference symbol L2 denotes an aluminum layer formed on the second conductive plate 2, and reference symbol P1 denotes an aluminum-nickel alloy layer. Other portions showing the same portions as in FIGS. 3, 4 and 5 are denoted by the same reference numerals and symbols as in FIGS. 3, 4 and 5.

It is preferable that in a case A having the above configuration, the second conductive plate 2 is provided with an aluminum layer L2 formed on the surface thereof contacting the insulating wall 1, and the second conductive plate 2 is attached to the insulating wall 1 via a conductive layer 5a containing an aluminum-nickel alloy layer or an aluminum layer and attached to the insulating wall 1 and the second conductor layer 1c.

In the case A of FIG. 3, it is preferable that the first conductive plate 3 is provided with an aluminum layer L1 formed on a surface thereof attached to the insulating wall 1, and the first conductive plate 3 is attached to the insulating wall 1 via an aluminum-nickel alloy layer P1, see FIG. 7, or an aluminum layer P2 formed at a part attached to the insulating wall 1 and via the first conductor layer 1b.

Figure 8:
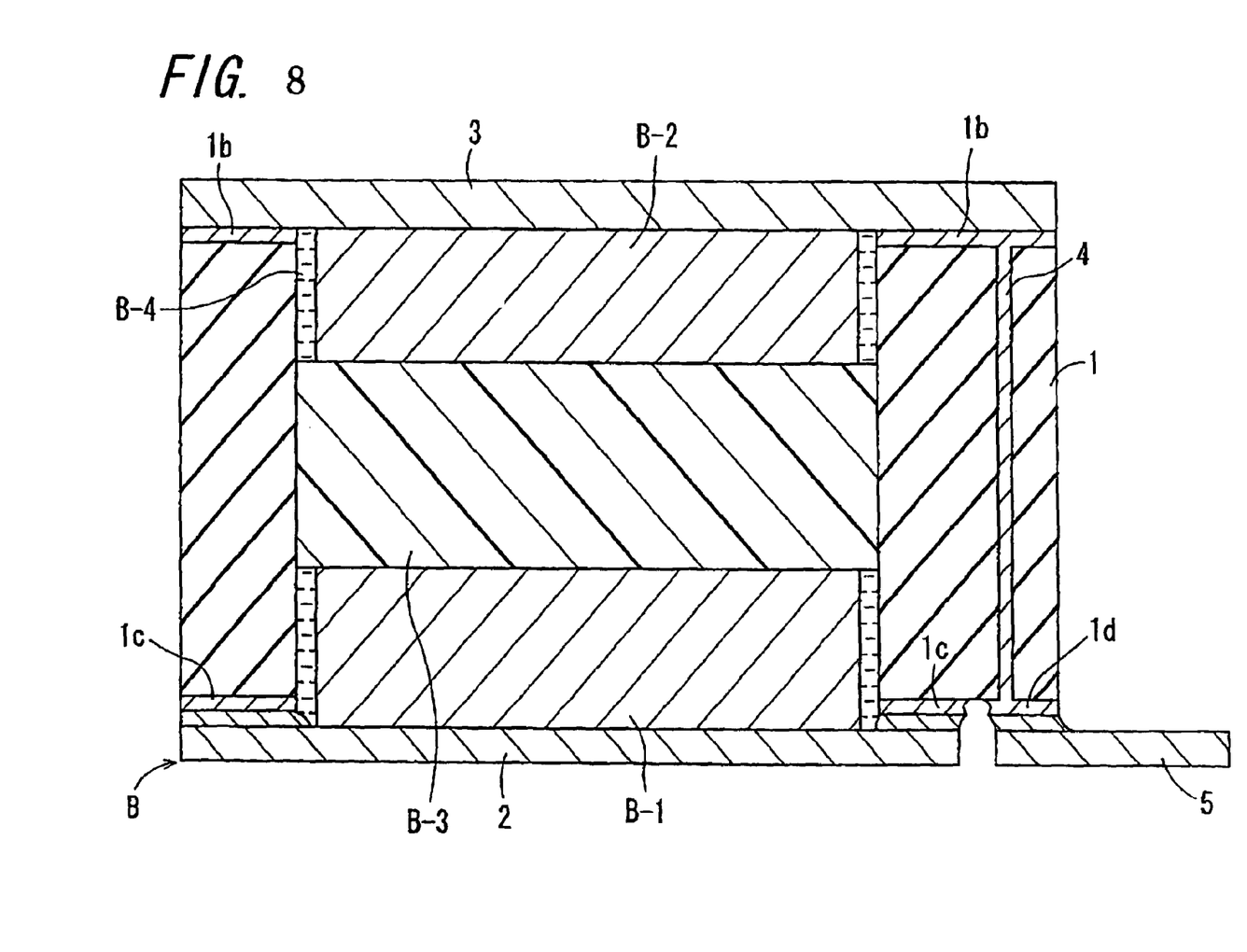
FIG. 8 is a cross section showing a battery or an electric double layer capacitor of the first embodiment of the invention.
Figure 9:
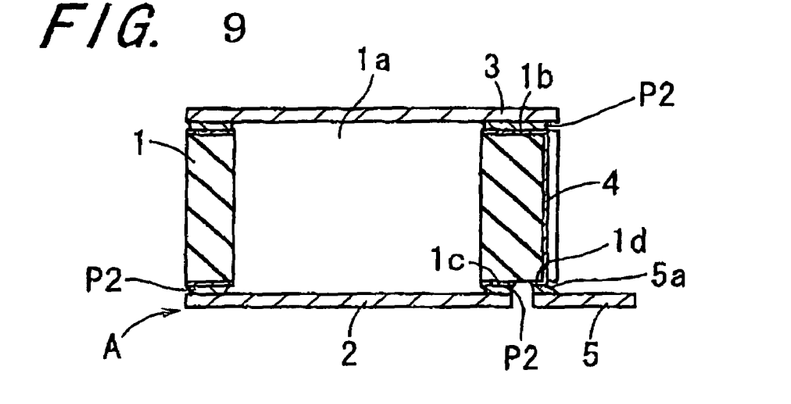
FIG. 9 is a cross section of an electronic component case according to a second embodiment of the invention.
Figure 10:
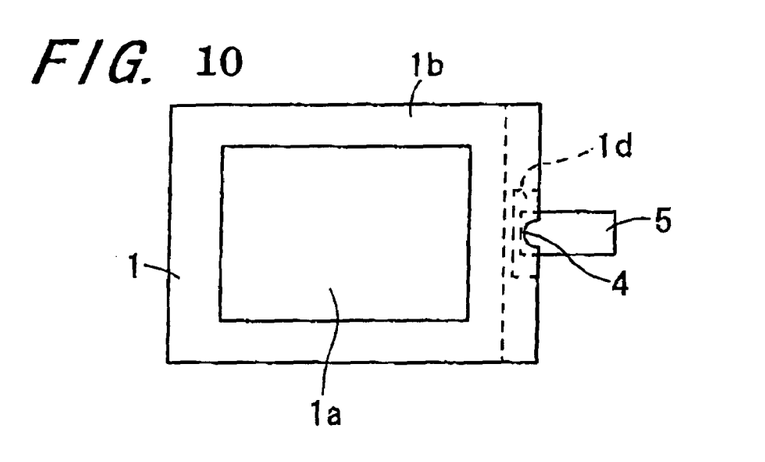
FIG. 10 is a top plan view of an electronic component case according to a second embodiment of the invention with the first conductive plate removed.
Figure 11:
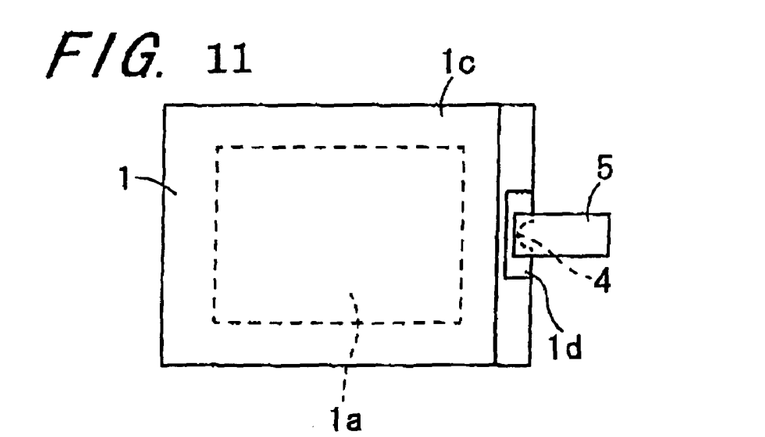
FIG. 11 is a bottom plan view of an electronic component according to a second embodiment of the invention.

FIG. 8 is a cross section showing a battery B, assembled the case A, according to the first embodiment of the invention. In FIG. 8, reference symbol B-1 denotes a positive electrode plate which is placed at the upper or interior surface of the second conductive plate 2 and electrically connected to the second conductive plate 2, reference symbol B-3 denotes an insulation sheet, reference symbol B-4 denotes an electrolytic solution, reference Symbol B-2 denotes a negative plate placed at the lower or interior surface of first conductive plate 3, to which it is electrically connected, and is separated from the positive electrode plate B-1 by the insulation sheet B-3. In FIGS. 3 to 8, the connection conductor 4 is realized by the know techniques of providing a through conductor or a conductor hole disposed inside of the insulating wall 1. In this embodiment, connection conductor 4 is realized by a through conductor or via a conductor hole disposed inside of the insulating wall 1.

FIGS. 9 to 14 show a second embodiment of the invention. These views correspond to FIGS. 3 through 8 respectively, so like elements are denoted by the same reference numerals and symbols. In this embodiment, reference symbol P2 denotes an aluminum layer at the joining of the second conductive plate 2 to the insulating wall 1 or the joining of the first conductive plate 3 to the insulating wall 1.

In FIGS. 9 to 14, the conductor 4 between the first conductor layer 1*b* and the electrode 1*d* is a so-called castellation formed in a known way of providing a groove on a surface of the insulating wall 1. As discussed previously, the connection conductor 4 in FIGS. 3 to 8 is realized by a through conductor or via a conductor hole disposed inside of the insulating wall 1. Functionally, the connection conductor 4 may take either form or be of mixed forms and the form is a matter of design choice.

For example, in the case where the insulating wall 1 is composed of a plurality of layers, the connection may be a through conductor from the upper end surface of the insulating wall 1 to the midway where it leads out to the side surface to become a side-surface castellation conductor from there.

Figure 12:
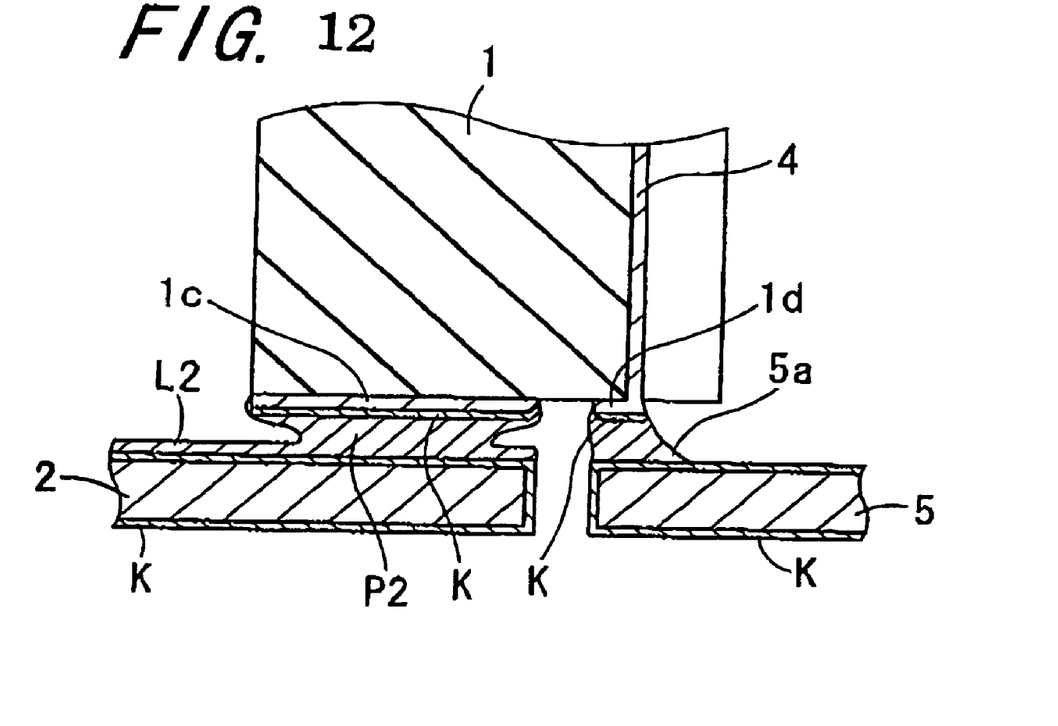
FIG. 12 is a partially enlarged cross section of the lower right part of FIG. 9.
Figure 13:
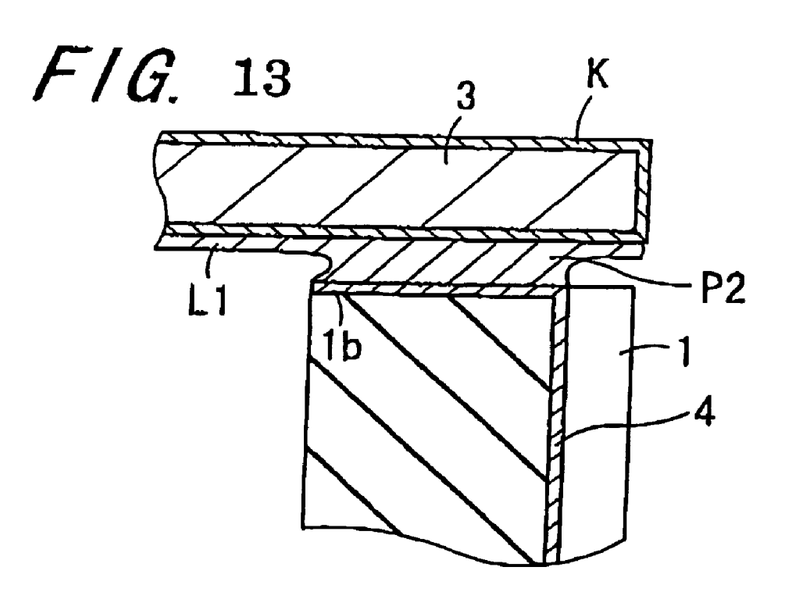
FIG. 13 is a partially enlarged cross section of the upper right part of FIG. 9.

In the process of forming the castellation conductor embodiment where the external connection terminal 5 is connected to the electrode 1*d*, the brazing material 5*a*, for example Ag solder or the like, flows along the side-surface castellation grove to form the conductor 4, see FIG. 12, and possibly falls a little short of firmly joining the external connection terminal 5 to the electrode 1*d*. However, when the side-surface castellation conductor is connected to the interlayer conductor and a through conductor which becomes a castellation from that midway, it is possible to prevent problems, such as the brazing material 5*a* ending short. In other words, in a case where the castellation conductor is formed only on a lower side of the insulating wall 1 and is connected to the through conductor via the interlayer conductor, since the length of the castellation conductor exposed to the side surface becomes short, it is easy to manage the amount of the brazing material.

The insulating wall 1 of the battery case A is made of sintered alumina ($Al_2O_3$), sintered mullite ($3Al_2O_3 \cdot 2SiO_2$), sintered aluminum nitride (AlN), glass ceramics or the like. For example, a insulating wall 1 of sintered alumina may be produced by mixing know components, such as a proper organic binder, a proper solvent and so, raw material powder of aluminum oxide ($Al_2O_3$), silicon oxide ($SiO_2$), magnesium oxide (MgO), calcium oxide (CaO) or the like to form slurry. The slurry is formed into a ceramic green sheet (referred to as green sheet hereinafter) by the doctor blade method or the calendar method, and cut into required sizes. Next, on each of a predetermined number of green sheets, the hollow or open portion 1*a* and a hole for the conductor 4 or a hole for forming a side-surface castellation conductor 4 are formed in punching process. Metal paste which chiefly contains powder of a high-melting-point metal such as tungsten (W) is print-applied to predetermined portions to the green sheet to form a metal paste layer which is to become the first, second conductor layers 1*b*, 1*c*, the electrode 1*d* or the connection conductor 4. Subsequently, the green sheets, are laminated, subjected to a proper cutting process, and burned at a temperature of approximately 1600° C., whereby the insulating wall 1 is produced.

Preferably, the exposed surfaces of the first and second conductor layers 1*b*, 1*c*, the electrode 1*d* and the connection conductor 4 formed on the insulating wall 1 are coated with a metal having excellent corrosion resistance and wetability with solder; one specific example is a nickel (Ni) layer having a thickness of 1-12 μm, applied by a plating method or the like. Consequently, it is possible to prevent oxidization corrosion and to have the wetability of the brazing material 5*a* form a solder meniscus of a required size.

When the thickness of the Ni layer is less than 1 μm, it becomes difficult to prevent oxidization corrosion of the respective conductors formed by metallization, and the conductive performances of the conductor layers deteriorate more easily. On the other hand, when the thickness of the Ni layer is over 12 μm, it takes increased plating time and the ability for mass-productivity decreases.

In the battery case A, FIGS. 3 to 8, the insulating wall 1 is resistant to being damaged by an electrolytic solution B-4 that contains an organic solvent, acid and so on, and impurities dissolved from the insulating wall 1 do not mix into the electrolytic solution B-4 and deteriorate the electrolytic solution B-4. Moreover, when the insulating wall 1 is made of sintered AlN, it is possible to transfer the heat of that operation so that it radiates outside efficiently and the electrolytic solution B-4 is virtually unchanged in quality due to heat.

Preferably, the second conductive plate 2 is made of an iron-based alloy, such as iron (Fe)-nickel (Ni)-cobalt (Co) alloy or Fe—Ni alloy, whose coefficient of thermal expansion is similar to that of the insulating wall 1. For example, the second conductive plate 2 may be produced by cutting a metal plate having a thickness of 0.2-0.5 mm into a desired size to become the base of the hollow or open portion 1*a* of the insulating wall 1, and coating the metal plate with the nickel layer K, see FIG. 12, having a thickness of 2-5 μm by the plating method. When the second conductive plate 2 is joined around the entire perimeter of the lower surface of the insulating wall 1, it hermetically seals the hollow or open portion 1*a*, and doubles as a positive electrode to which the positive electrode plate B-1 is joined, see FIG. 14.

Since the integrated second conductive plate 2 doubles as a positive electrode, it is possible to lower resistance, in comparison to the case where the positive electrode plate B-1 is connected to a positive electrode via an internal wiring conductor or the like, decrease the internal resistance of the battery B, prevent resistance loss and inhibit generation of heat. Moreover, since it is possible to radiate heat from the second conductive plate 2, such as to an external electronic cooling circuit or the like, the cooling effect on the battery B is increased.

Like plate 2, the external connection terminal 5 is made by cutting to size an iron-based alloy plate whose thermal expansion coefficient is similar to that of the insulating wall 1. The external terminal 5 is preferable coated with the nickel layer K having a thickness of 2-5 μm by the plating method. And then, the external connection terminal 5 is joined to the electrode 1*d* of the insulating wall 1 via the brazing material 5*a* made of Ag solder or the like. When it is joined to the electrode 1d, an end portion of the terminal 5 extends outwardly from the lower surface of the insulating wall 1.

When the second conductive plate 2 and the external connection terminal 5 are produced, as preferred, by the use of metal plates having the same thickness, the lower surface of the second conductive plate 2 is flush with the lower surface of the external connection terminal 5, it is possible to easily mount and connect the second conductive plate 2 and the external connection terminal 5 on a connecting electrode on the external electric circuit board by the surface mounting method.

In joining the battery B using the battery case A to an external electric circuit board, it is preferable that a connecting electrode on the external electric circuit board corresponding to the entire rear surface (lower surface) of the second conductive plate 2 and a connecting electrode corresponding to the external connection terminal 5 are previously disposed on the external electric circuit board, but the second conductive plate 2 may have a shape such that a part 5' extending out from the second conductive plate 2 is disposed so as to have the same area as the external connecting terminal 5. On this occasion, it is preferable to form a solder-flow prevention dam made of resin or the like around the part 5' extending out for connection so that solder does not flow too much to the rear of the second conductive plate 2.

Further, by making the second conductive plate 2 and the external connecting terminal 5 have the parts extending out from the lower surface of the insulating wall 1, it is possible to join the end portions of the respective parts extending out from the lower surface of the insulating wall 1 to the connecting electrodes on the external electric circuit board, so that it is possible to visually check the joint state. Moreover, since the extending-out parts have elasticity, the battery B becomes hard to disconnect from the external electric circuit board.

Because it is easier to form the insulating wall 1 provided with the connection conductor 4 by the green sheet laminating method and same sized metallic plates are used, it is possible to make the lower surface of the second conductive plate 2 double as a positive electrode and the lower surface of the external connection terminal 5 double as a negative electrode, since it is electrically connected to the first conductive plate 3, rest on the same level with each other, or in the same horizontal plane. Consequently, this makes it possible to achieve closures that can be metalized for greater joint strength and easy in joining the second conductive plate 2 via the second conductor layer 1c, and the external connection terminal 5 via the electrode 1d.

Figure 14:
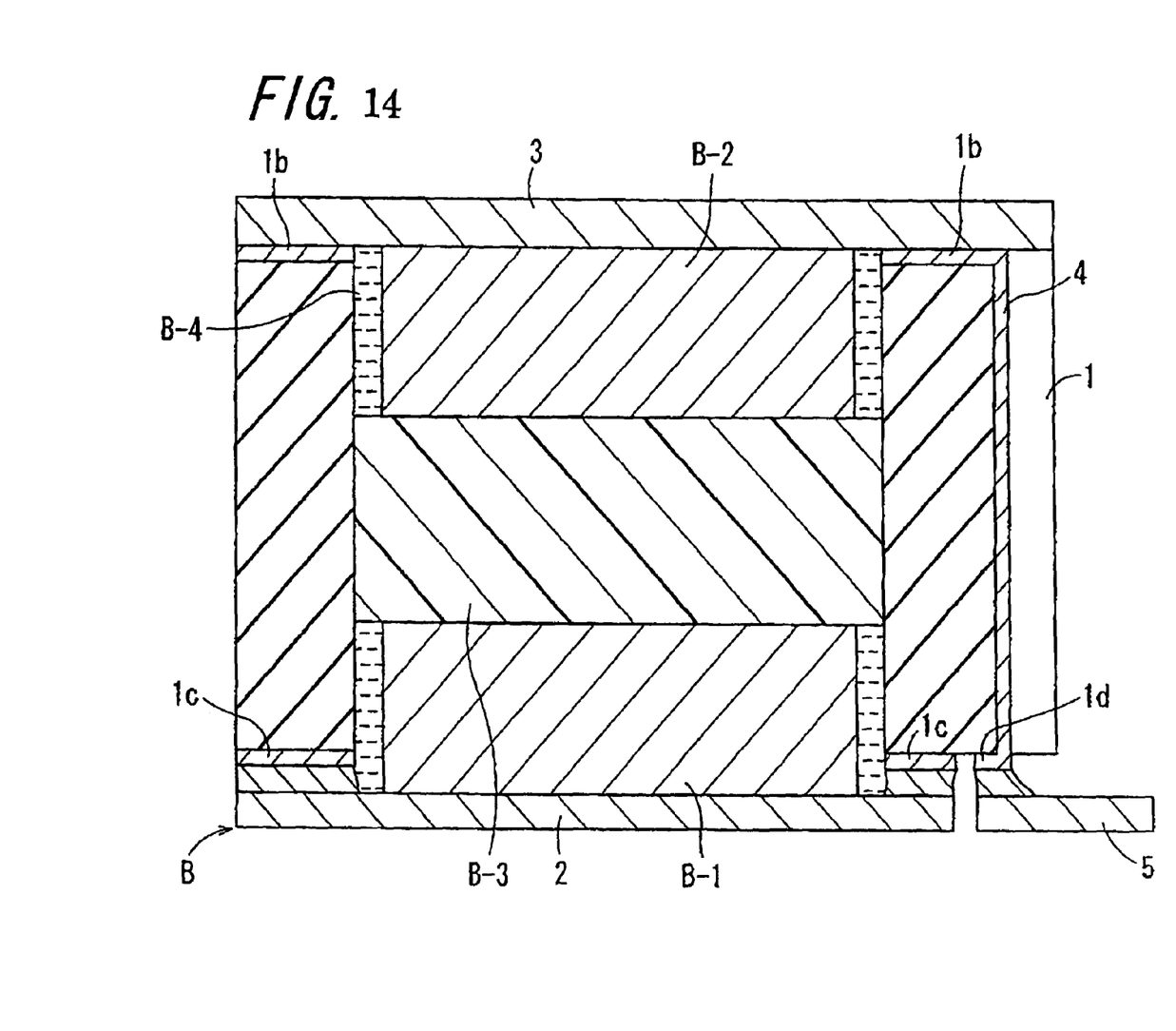
FIG. 14 is a cross section showing a battery or electric double layer capacitor according to the second embodiment of the invention.

The upper surface of the second conductive plate 2 is joined to the inner surface of the insulating wall 1 forming the hollow or open portion 1a by the electrolyte resistant aluminum layer L2, see FIGS. 6 and 12 and 14, having a thickness of 1-15 μm formed by, for example, a sputtering method. By forming the aluminum layer L2 in this way, it effectively inhibits Ni of the nickel layer K, W of the second conductor layer 1c and the electrode 1d, which is a metallic component, and the metal of the second conductive plate 2 from dissolving into the electrolytic solution B-4 due to voltage changes from charging and discharging.

Stated in another way, the aluminum layer L2 acts to protect the electrically conducting portions from corrosion caused by the electrolytic solution B-4, which is typically formed by dissolving lithium salt such as lithium tetrafluoroborate or acid such as hydrochloric acid, sulfuric acid or nitric acid into an organic solvent such as dimethoxyethane or propylene carbonate. It is preferable that the thickness of the aluminum layer L2 is 1-15 μm, because when it is less than 1 μm, it becomes difficult to prevent corrosion by the electrolytic solution B-4, and the performance of the electrolytic solution B-4 deteriorates more easily. On the other hand, when the thickness is over 15 μm, it takes increased time to form the aluminum layer L2, and productivity decreases accordingly.

The abovementioned sputtering method is a known method using a phenomenon which occurs when argon (Ar) ions or the like are caused to collide the surface of pelletized aluminum as a target located in a decompressed space and aluminum atoms are thereby emitted from the surface of the aluminum into the space, the aluminum atoms attach to the surface of an object located nearby, and the sputtering method is one of the optimum methods as a method for forming the aluminum layer L2 because a closely-packed layer or film can be formed. The aluminum layer L2 can also be formed by other known method, such as a chemical vapor deposition, melting or plating.

The first conductive plate 3 is made of an iron-based alloy such as Fe—Ni—Co alloy or Fe—Ni alloy. The first conductive plate 3 is produced by cutting a metal plate having a thickness of 0.2-0.5 mm so as to fit the outer shape of the upper end surface of the insulating wall 1, and coating with the nickel layer K having a thickness of 2-5 μm by the plating method, and subsequently, sequentially coating at least the lower surface of the first conductive plate 3 with the aluminum layer L1 having a thickness of 1-15 μm by the sputtering method.

It is preferable that the thickness of the aluminum layer L1 is 1-15 μm, because a thickness less than 1 μm makes it difficult to prevent corrosion and deterioration of the performance of the electrolytic solution B-4. On the other hand, a thickness over 15 μm takes a lot of time to form which reduces productivity and an undesirable increase in the welding temperature.

Figure 15:
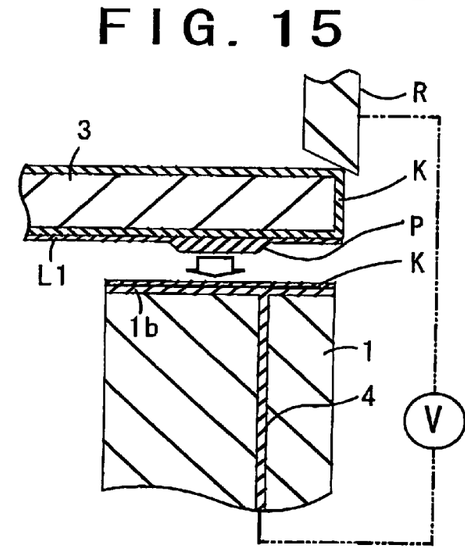
FIG. 15 is a partially enlarged cross section illustrating an assembling method of the battery or the electric double layer capacitor.
Figure 16:
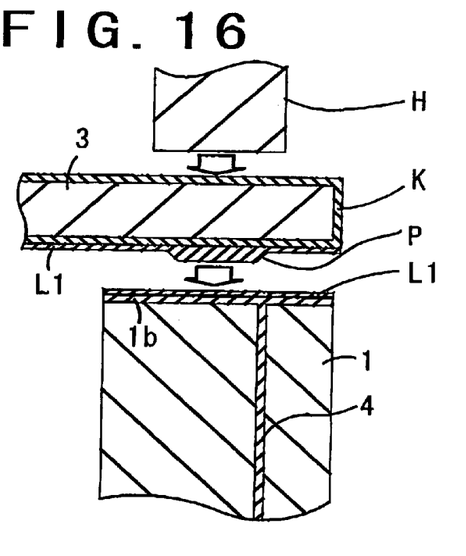
FIG. 16 is a partially enlarged cross section illustrating another assembling method of the battery or the electric double layer capacitor.

Further, as shown in FIGS. 15 and 16, it is preferable that a perimeter or projecting ridge P, with a triangular or trapezoidal cross section and a height in the range of 10-30 μm, is formed in or on the first conductive plate 3 at the design point of joining to the first conductor layer 1b. In joining the first conductive plate 3 onto the first conductor layer 1b, the ridge P serves as an energy director. With resistance welding, this makes it possible to securely weld in a short time by quickly increasing the welding temperature to a predetermined temperature. With ultrasonic welding, the projecting ridge P is moderately compressed into the conductor layer when tip pressure and ultrasonic waves are applied. This provides a secure joint even if the opposed surfaces are not perfectly flat.

The projected ridge P can be formed at a part joined to the first conductor layer 1b on the outer rim of the first conductive plate 3 by molding the first conductive plate 3 by press molding or the like, for example.

In joining the first conductive plate 3 to the first conductor layer 1b, it should be remembered that the surface of the first conductor layer 1b, having a thickness of 10-20 μm, is formed to the shape of the upper end surface of the insulating wall 1 on the entire perimeter around the hollow or open portion 1a of the upper end surface of the insulating wall 1. They are sequentially coated with the nickel layer K having a thickness of 1-12 μm and the aluminum layer having a thickness of 1-15 μm, and next, the first conductive plate 3 is placed on the upper end surface of the insulating wall 1 so as to fit the surface of the aluminum layer L1 of the first conductive plate 3 to the first conductor layer 1b, and thereafter, joining them, such as the seam welding method as shown in FIG. 15 or the spot welding method, or by the ultrasonic joining method as shown in FIG. 16. Coating the surface of the first conductor layer 1b with the aluminum layer is preferred for joining the first conductive plate 3 to the first conductor layer 1b by the ultrasonic joining method.

Referring to FIG. 15, the seam welding method is a known method by which a linear weld is formed by applying an electric current to parts to be joined while rotationally moving the side portion of a conical roller R along the parts to be joined. In FIG. 15, a power supply V is electrically connected with the roller R and the connection conductor 4 via the electrode 1d. In addition to seam welding, the resistance welding method includes the spot welding method and the TIG (tungsten-inert-gas) welding method in which tungsten is used for an electrode, the seam welding method is preferable because it makes it possible to weld linearly and achieve preferable air tightness. Moreover, in the case of the joining method with the brazing material 5a, the brazing material 5a is fused and joined in a high-temperature furnace, but seam welding can be performed in the normal temperature atmosphere, so that case A is not exposed to a large build up of heat.

By seam welding the end portion of the first conductive plate 3 on the perimeter side, a large electric current flows on the outer side of the joint portion between the first conductive plate 3 and the first conductor layer 1b, and the aluminum layer L1 and the nickel layer K coating the joint portion between the first conductor layer 1b and the first conductive plate 3 are fused with each other in an extremely short time, and the aluminum-nickel alloy layer P1 in the eutectic state is formed at temperatures of 800-900° C. approximately. As a result, it is possible to realize an extremely highly reliable and firm joint. The aluminum-nickel alloy is preferred because it is stable against the electrolytic solution B-4 and is not readily dissolved thereby.

In an example of the present embodiment, seam welding was performed by connecting one end of a welding electrode to the electrode 1d on the lower surface of the battery case A, placing the first conductive plate 3 on the upper end surface of the insulating wall 1 so as to cover the hollow or open portion 1a, and moving a roller R for seam welding at approximately 10 mm/second while applying an electric current of approximately a few amperes to the end portion of the first conductive plate 3 on the perimeter side from above the first conductive plate 3, whereby the aluminum-nickel alloy layer P1 having a frame shape or a ring shape was obtained.

By using the ultrasonic joining method as shown in FIG. 16 for joining the second conductor layer 1c formed on the lower surface of the insulating wall 1 to the second conductive plate 2, or when joining the first conductive plate 3 to the first conductor layer 1b formed on the upper end surface of the insulating wall 1, it is possible to produce a battery case without a large heat build up.

Referring to FIG. 16, ultrasonic joining is a method of using acoustic energy or vibrations to firmly and reliably join objects. The insulating wall 1 and the first conductive plate 3 are set between a horn H which has a tip to be a medium of vibrations and an anvil. A pressure of approximately 30-50 Newtons (N) is applied in the vertical direction, and simultaneously, ultrasonic vibrations of 15-30 KHz are applied along the perimeter of the first conductive plate 3 while it is continuously moving. The time necessary for welding may be varied by altering the pressure in the vertical direction or the shape of the tip.

With the ultrasonic joining method, any oxide film or dirt on the surface of the joint portion is pressed outwardly from the joint portion in the initial stage in which ultrasonic vibrations are applied, and aluminum crystal grains of the first conductive plate 3 and the insulating wall 1 come close to each other at an atomic distance, where mutual attraction works among the atoms, to form a firm joint. Because a temperature of one third or less of the melting point of a metal is used, the electrolytic solution B-4 is virtually unchanged in quality and this results in longer battery life.

With the ultrasonic joining method, the other metals hardly diffuse in the aluminum, and therefore, the aluminum layer P2 has more corrosion resistance to the electrolytic solution B-4.

The ultrasonic method or the seam welding method may be used in joining the second conductive plate 2 to the second conductor layer 1c, instead of the above-mentioned method to join via the brazing material 5a.

With reference to FIGS. 8 and 14, the battery B of the invention will be described in detail. The battery B of the invention comprises the abovementioned battery case A, a positive electrode plate B-1 that rest on and is electrically connected to the second conductive plate 2, a porous insulation sheet B-3 that is impregnated with an electrolytic solution B-4, and a negative electrode plate B-2 that is electrically connected to the first conductive plate 3 and separated from the positive electrode plate B-1 by the porous insulation sheet B-3. The insulation sheet B-3 separates the positive and negative electrode plates B-1 and B-2 while passing ions between them. It is noted that the positions of the positive electrode plate B-1 and the negative electrode plate B-2 may be replaced with each other. That is, the negative electrode plate B-2 may be positioned on a side of the second conductive plate 2, and the positive electrode plate B-1 may be positioned on a side of the first conductive plate 2.

By interposing an electrically conductive joining material, which chiefly contains carbon, between the second conductive plate 2 and the positive electrode plate B-1, and between the negative electrode plate B-2 and the first conductive plate 3, it is possible to more securely perform electric connection there between.

The resultant battery B has highly reliable air tightness and can withstand repeated charging and discharging with stability, and it can be more securely and easily connected an external electric circuit board by the surface mounting method with solder or the like. It is also excellent in mass-productivity of the external electric circuit board, because the lower surface of the second conductive plate 2, which doubles as a positive electrode, and the lower surface of the external connection terminal 5 are on the same level or plane.

The positive electrode plate B-1 is made from a plate or a sheet containing a positive electrode active material, such as $LiCoO_2$ or $LiMn_2O_4$, and an electrically conductive material, such as acetylene black or graphite, and the negative electrode plate B-2 is made from a plate or a sheet containing a negative electrode active material made of a carbon material, such as coke or carbon fiber. After the positive electrode plate B-1 is produced as described, it is cut into the desired shape. The negative electrode plate B-2 is produced in the same manner.

The insulation sheet B-3 is made as previously described and impregnated with the electrolytic solution B-4. When placed between the positive electrode plate B-1 and the negative electrode plate B-2, the insulation sheet B-3 prevents contact between them, but enables lithium ions to move between them. The electrolytic solution B-4 may be made by dissolving a lithium salt, such as lithium tetrafluoroborate, or an acid, such as hydrochloric acid, sulfuric acid or nitric acid, into an organic solvent, such as dimethoxyethane or propylene carbonate.

Although the electrolytic solution B-4 has high corrosiveness and solubility, the insulating wall 1 of the battery case A for the battery B is excellent in chemical resistance and resistant to being damaged by the electrolytic solution B-4. This reduces impurities that are potentially dissolved from the battery case A and mixed into the electrolytic solution B-4. Because the electrolytic solution B-4 does not deteriorate at the rate of the prior art constructions, it has a longer and more favorable performance life.

In the prior art using a battery case made of stainless steel, as shown in FIGS. 1 and 2, a positive electrode case 11 and a sealing plate 12 are integrated by caulking the surroundings thereof via a gasket 15, made of polypropylene resin or the like, and the thickness at the caulked part, including the positive electrode case 11, the sealing plate 12 and the gasket 15, becomes about 2 mm, whereas according to the invention, there is no caulking portion, so that the battery B can have a smaller outer shape and a thickness of less than about 2 mm.

When the battery B was exposed to a temperature cycle test, the joint between the frame 1 and the second conductive plate 2 or the first conductive plate 3 did not becomes loose due to thermal stress and there was no leaking of the electrolytic solution B-4.

Still further, it is possible to electrically connect the first conductive plate 3 to the upper surface of the negative electrode plate B-2 so as to abut there against, it is possible to largely reduce electric resistance between the negative electrode plate B-2 and the first conductive plate 3 by connecting the first conductive plate 3 and the negative electrode plate B-2 in a broad area, and it is possible to efficiently charge and discharge, so that the battery B is highly reliable, and can withstand charge and discharge cycling for a long term with stability.

The invention also contemplates use of the case for electronic components, and the electric double layer capacitor of the invention has the same configurations, operations and effects as the abovementioned battery B when assembled in case A.

That is to say, the electric double layer capacitor case A comprises an insulating wall 1 having an upper end surface and a bottom end surface, and defining an interior void, a first conductive plate 3 made of metal attached to the upper end surface of the insulating wall 1, and a second conductive plate 2 made of metal attached to the bottom end surface of the insulating wall 1. A hollow or open portion 1a, having a desired shape, such as rectangular, a polygonal or a cylindrical, is formed within the insulating wall 1. The insulating wall 1 has a first conductor layer 1b formed on the entire perimeter of the upper end surface thereof, and a second conductor layer 1c formed on the entire perimeter of the lower surface as another surface thereof. The electrode 1d, see FIGS. 4 and 5, formed at the peripheral portion of the lower surface of the insulating wall 1 is electrically independent from the second conductor layer 1c, an external connection terminal 5 is electrically connected to the electrode 1d, and a connection conductor 4 connects the first conductor layer 1b to the electrode 1d. The second conductive plate 2 is attached to the insulating wall 1 via the second conductor layer 1c, and the first conductive plate 3 is joined to the insulating wall 2 via the first conductor layer 1b.

It is preferable that in the electric double layer capacitor case A having the above configuration, the second conductive plate 2 is provided with an aluminum layer L2 formed on the surface thereof contacting the insulating wall 1, and the second conductive plate 2 is attached to the insulating wall 1 via a conductive layer 5a containing an aluminum-nickel alloy layer or an aluminum layer and attached to the insulating wall 1 and via the second conductor layer 1c.

In the electric double layer capacitor case A of FIG. 3, it is preferable that the first conductive plate 3 is provided with an aluminum layer L1 formed on the surface thereof attached to the insulating wall 1, and the first conductive plate 3 is attached to the insulating wall 1 via an aluminum-nickel alloy layer P1, see FIG. 7, or an aluminum layer P2 formed at a part attached to the insulating wall 1 and via the first conductor layer 1b.

With reference to FIGS. 8 and 14, the electric double layer capacitor B of the invention comprises the electric double layer capacitor case A described above, a first electrode B-1 that rest on and is electrically connected to the second conductive plate 2, a separator B-3 that is impregnated with an electrolytic solution B-4, and a second electrode B-2 that is electrically connected to the first conductive plate 3 and separated from the first electrode B-1 by the separator B-3. The separator B-3 separates the first and second electrodes B-1 and B-2 while passing ions between them. It is noted that the positions of the first electrode B-1 and the second electrode B-2 may be replaced with each other. That is, the second electrode B-2 may be positioned on a side of the second conductive plate 2, and the first electrode B-1 may be positioned on a side of the first conductive plate 2.

The first electrode B-1 and the second electrode B-2 are obtained by, for example, performing carbonization and activation of phenol resin fiber (novoloid fiber). The activation is performed by putting the fiber into contact with activation gas such as high-temperature steam in the high-temperature atmosphere of 800-1000° C., and the first electrode B-1 and the second electrode B-2 are produced in the process of gasifying volatile matters in a carbide or part of carbon atoms, and developing a fine structure of 1-10 nm chiefly so that the inner surface area becomes $1\times10^6$ m$^2$/kg or more. In the electric double layer capacitor B of the invention, there is no polarity at the second conductive plate 2 or the external connection terminal 5, so that it is possible to use the side of the second conductive plate 2 as the anode and the side of the external connection terminal as the cathode, and vice versa.

The electrolytic solution B-4 is made by, for example, dissolving a lithium salt such as lithium phosphate hexafluoride ($LiPF_6$) or a quaternary ammonium salt such as tetraethylammonium tetrafluoroborate ($(C_2H_5)_4NBF_4$) into a solvent such as propylene carbonate (PC) or sulfolane (SLF).

As for the separator B-3 in this construction, glass fibers, a resin having thermal resistance such as polyphenylene sulfide, polyethylene terephthalate or polyamide are used.

The electric double layer capacitor B is obtained by the following manner. The first electrode B-1, the separator B-3, the second electrode B-2 and the first conductive plate 3 are placed on the second conductive plate 2 so as to closely contact to each other. After the electrolytic solution B-4 is inserted, the first conductive plate 3 is joined by generated Joule heat obtained by rotationally moving while lightly pressing a roller charged with electricity along the rim of the upper surface of the first conductive plate 3 using the seam welding method, or the first conductive plate 3 is joined to the upper end surface of the insulating wall 1 by causing the aluminum layers L1 of the lower surface of the first conductive plate 3 and the surface of the first conductor layer 1b to fuse with each other using the ultrasonic welding method.

The invention is not limited to the abovementioned embodiments, and can be changed in various manners within the scope of the invention. For example, although the described constructions using the case A have only a single hollow or open portion 1a, the case A may have a plurality of portions 1a. In this case, the first conductive plate 3 or the second conductive plate 2 will generally be such that one first conductive plate 3 or one second conductive plate 2 covers all the portions 1a. One case where a plurality of first conductive plates 3 or plates 2 is where a high-capacity battery B or electric double layer capacitor B is realized by connecting the produced battery B or electric double layer capacitor B to the respective portions 1*a* in parallel, or a battery B or electric double layer capacitor B is connected in series to supply a higher voltage.

Alternatively, the case A and the components B described in the invention may have a seal ring made of Fe—Ni—Co alloy or the like interposed between the insulating wall 1 and the first conductive plate 3 or between the insulating wall 1 and the second conductive plate 2. In this alternative, after nickel plating is applied to the upper surface of the first conductor layer 1*b*, a seal ring is brazed with Ag solder, and the nickel layer K and the aluminum layer L1 are formed on the surface thereof, the first conductive plate 3 may be joined thereto by the resistance welding method or the ultrasonic joining method so as to abut there against. In this case, even if the insulating wall 1 transforms somewhat, the seal ring can absorb the transformation, so that it is possible to obtain a construction with higher reliability.

Reference was made to the insulating wall 1 in the shape of a cylinder having uniform thickness, however, a insulating wall may be used which has an inner side surface of varying depths between upper and lower parts thereof. For instance, the upper part may be wider than the lower part. See 1*a*' of FIG. 3. In this case, it is made possible by placing an insulation sheet B-3 so as to contact the top surface of the step that a positional displacement in the horizontal direction of the insulation sheet B-3 is avoided and that the area in a top plan view of the negative electrode plate B-2 disposed on the top surface is made larger than that of the positive electrode plate B-1. Accordingly degradation of the battery or electric double layer capacitor B due to a positional displacement of the negative electrode plate B-2 can be prevented.

Figure 17:
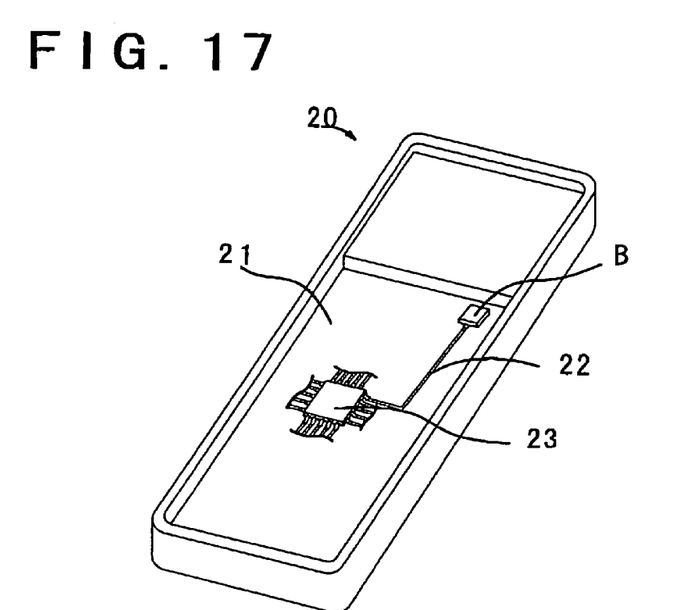
FIG. 17 is a perspective view showing an example of an electric device using the battery or the electric double layer capacitor.

The battery or electric double layer capacitor B mentioned above is suitable for use in a backup power supply, standby power supply of electronic devices or the like. For example, as shown in FIG. 17, the battery or electric double layer capacitor B is mounted on an external electric circuit board 21 within the electronic device 20 by surface mounting, and its electrode is connected to, for example, a power supply terminal of an LSI 23 via a wiring 22. When a main power of the electronic device is cut off, electric power for maintaining a minimum function such as a clock function or a volatile memory backup function of the LSI 23 is supplied from the battery or electric double layer capacitor B.

Since, the same as the other electronic components, the battery or electric double layer capacitor B of the invention can be easily mounted on the external electric circuit board 21 by surface mounting and can be mounted in a compact room within the electronic device 20, it is possible to provide a small and reliable electronic device having high mass productivity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic component case comprising:
    an insulating wall defining a closed perimeter which includes a first opening at a first end and a second opening at a second end and defining an interior void;
    a first conductive plate attached to a first end surface of the first end of the insulating wall such that the first conductive plate covers the first opening of the insulating wall;
    a second conductive plate attached to a second end surface of the second end of the insulating wall such that the second conductive plate covers the second opening of the insulating wall but does not cover a portion of the second end surface and is electrically independent from the first conductive plate;
    an external terminal attached to the portion of the second end surface of the insulating wall, the external terminal being separate from the second conductive plate; and
    a connection conductor disposed in the insulating wall or on an exterior surface of the insulating wall and electrically connecting the first conductive plate and the external terminal.

2. The electronic component case of claim 1 wherein the external terminal extends out from the second end surface of the insulating wall.

3. The electronic component case of claim 2 wherein the second conductive plate extends out from the second end surface of the insulating wall.

4. The electronic component case of claim 1 wherein the insulating wall is a ceramic.

5. The electronic component case of claim 4 wherein the insulating wall has:
    a first conductor layer provided on the first end surface; and
    a second conductor layer provided on the second end surface that is electrically independent of the connection conductor and the external terminal.

6. The electronic component case of claim 5 wherein an aluminum layer or an aluminum-nickel layer is interposed between the first conductive plate and the first conductor layer.

7. The electronic component case of claim 5 wherein an aluminum layer or an aluminum-nickel layer is interposed between the second conductive plate and the second conductor layer.

8. The electronic component case of claim 1 wherein a battery assembly is contained in the interior void of the insulating wall.

9. The electronic component case of claim 1 wherein a double layer capacitor assembly is contained in the interior void of the insulating wall.

10. The electronic component case of claim 8 wherein the battery assembly comprises:
    an electrode electrically connected to the first conductive plate and another electrode electrically connected to the second conductive plate wherein one of the electrodes is a positive electrode and the other is a negative electrode; and
    an electrolyte impregnated insulation sheet that separates the positive and negative electrodes while passing ions between them.

11. The electronic component case of claim 9 wherein the double layer capacitor comprises:
    a first electrode electrically connected to the first conductive plate;
    a second electrode electrically connected to the second conductive plate; and
    an electrolyte impregnated insulation sheet that separates the first and second electrodes while passing ions between them.

12. An electronic device including a circuit board and the electronic component case of claim 8 mounted on the circuit board.

13. An electronic device including a circuit board and the electronic component case of claim 9 mounted on the circuit board.

* * * * *